(12) United States Patent
Aiken et al.

(10) Patent No.: US 12,042,072 B2
(45) Date of Patent: Jul. 23, 2024

(54) TRELLIS BRACKET AND SYSTEM FOR SUPPORTING CLIMBING PLANTS FROM TOP OF A WALL OR FENCE ON BOTH SIDES

(71) Applicants: John Edward Aiken, Monroeville, PA (US); Edward Scott Carlson, Delmont, PA (US)

(72) Inventors: John Edward Aiken, Monroeville, PA (US); Edward Scott Carlson, Delmont, PA (US)

( * ) Notice: Subject to any disclaimer, the term of this patent is extended or adjusted under 35 U.S.C. 154(b) by 101 days.

(21) Appl. No.: 17/959,245

(22) Filed: Oct. 3, 2022

(65) Prior Publication Data
US 2023/0105517 A1    Apr. 6, 2023

Related U.S. Application Data (60) Provisional application No. 63/251,318, filed on Oct. 1, 2021.

(51) Int. Cl.
*A47G 7/04*  (2006.01)
*A01G 9/12*  (2006.01)
*A01G 17/06* (2006.01)

(52) U.S. Cl.
CPC .............. *A47G 7/044* (2013.01); *A01G 9/12* (2013.01); *A01G 17/06* (2013.01); *A47G 7/045* (2013.01)

(58) Field of Classification Search
CPC .... A01G 9/12; A01G 17/08; A01G 2017/065; A01G 17/06; A01G 17/04; A47G 7/044; A47G 7/045; A47G 25/0614; A47G 7/042; A47G 7/047; A47G 7/04; A47G 7/041; F16M 13/02; F16M 11/00; F16B 45/00; A47H 1/122; A47H 1/142; A47H 1/14
USPC ......................................................... 248/27.8
See application file for complete search history.

(56) References Cited

U.S. PATENT DOCUMENTS

| 1,795,657 | A | * | 3/1931 | Madvig | A47H 1/122 248/265 |
| 1,869,281 | A | * | 7/1932 | Rumpf | A47H 1/122 248/265 |
| 1,914,617 | A | * | 6/1933 | Rogers | A47G 7/044 211/88.03 |
| 1,955,476 | A | * | 4/1934 | Torgersen | A47G 7/044 248/312.1 |
| 3,145,847 | A | * | 8/1964 | Clement | A47G 7/044 248/27.8 |
| 3,264,783 | A | | 8/1966 | Bayliss | |
| 3,935,671 | A | | 2/1976 | Soot | |
| 4,559,738 | A | * | 12/1985 | Helfman | A47H 27/00 D6/403 |

(Continued)

*Primary Examiner* — Taylor Morris (57) ABSTRACT

An adjustable fence-top trellis support bracket assembly forms the basis of a system for creating adjustable trellises on two sides of a fence or wall, and includes a) an elongated support bracket member, b) curved-loop ends on the elongated bar member and the adjoining bracket portion wherein one is attached proximal one end and the other proximal an opposite end of an elongated bar member; c) a movable L-shaped leg generally perpendicular to an elongated bar member of the elongated support bracket portion, wherein the movable leg is engagable with the elongated support bracket member; and d) a means for adjusting and then securing the movable L-shaped leg against the elongated bar portion of the support bracket member.

5 Claims, 7 Drawing Sheets

(56) References Cited

U.S. PATENT DOCUMENTS

| | | | |
|---|---|---|---|
| D299,088 S * | 12/1988 | Monza | D26/9 |
| 4,908,982 A * | 3/1990 | Quatrini | A47G 7/042 248/297.51 |
| 5,368,267 A * | 11/1994 | Howard | A47G 7/044 248/274.1 |
| 5,577,699 A * | 11/1996 | Gardner | A47F 5/08 248/302 |
| 5,607,131 A * | 3/1997 | Adams | A47G 25/0614 248/304 |
| 5,738,319 A * | 4/1998 | Grassi | A47G 7/044 248/215 |
| 6,398,174 B1 * | 6/2002 | Emalfarb | A47G 7/044 248/295.11 |
| 7,152,368 B2 | 12/2006 | Swanson | |
| 7,249,439 B2 * | 7/2007 | Pierce, Jr. | A01G 17/06 47/46 |
| D568,727 S * | 5/2008 | Walker | D8/380 |
| 7,735,800 B2 * | 6/2010 | Lunato | A47G 7/044 47/68 |
| 9,211,023 B1 * | 12/2015 | Weiss | A47G 25/0614 |
| 9,307,700 B1 * | 4/2016 | Schmitt | E04H 13/001 |
| 10,631,672 B2 * | 4/2020 | Murphy | F16M 13/02 |
| 11,317,743 B1 * | 5/2022 | Saman | A47G 7/044 |
| 2005/0035250 A1 * | 2/2005 | Schoneboom | A47G 7/045 248/217.2 |
| 2007/0205346 A1 * | 9/2007 | Jackson | A47G 25/0614 248/307 |
| 2010/0005714 A1 * | 1/2010 | Aiken | A01G 9/122 47/47 |
| 2010/0325949 A1 | 12/2010 | Carlson | |
| 2011/0036005 A1 * | 2/2011 | Aiken | A01G 9/12 47/70 |
| 2013/0240697 A1 * | 9/2013 | Rutigliano | F16B 45/005 248/227.1 |
| 2021/0007292 A1 * | 1/2021 | Carlson | A01G 9/12 |

* cited by examiner

TRELLIS BRACKET AND SYSTEM FOR SUPPORTING CLIMBING PLANTS FROM TOP OF A WALL OR FENCE ON BOTH SIDES

CROSS-REFERENCE TO RELATED APPLICATIONS

This application claims priority to U.S. Provisional Patent Application No. 63/251,318 filed Oct. 1, 2021.

FIELD OF THE INVENTION

The present invention relates, in general, to supporting vines or climbing plants, and, more particularly, the present invention relates to a system and apparatus for supporting such vines and climbing plants over a wide range of widths and heights, and that has been designed for installation on top of a wall or fence for plant growth on both sides.

BACKGROUND OF THE INVENTION

Vines or climbing plants are some of the most versatile plants in a garden or landscape, especially for limited ground area. Support structures, such as trellises and arbors, are commonly used for such plant. Presently available trellises are typically installed in the ground or parallel to a wall. They can be used advantageously for both ornamental and vegetable-growing plants, but for a limited height, typically no more than 6 feet, and a limited width of no more than 3 feet.

Ground supported trellises, some attached to a wall or fence, are the most common and many designs exist. Vines typically have to be planted adjacent to a trellis. Installation of a ground supported trellis can be time consuming and cumbersome because holes need to be created in the ground and many trellises commonly require additional support sleeves or wall attachments in order to keep them erect. If no support sleeve or concrete is used, then the ground supported trellis will tend to lean or collapse when a plant becomes top heavy. In addition, if wood trellises are installed directly in the ground, the legs can rot requiring a new trellis in time. Similarly, steel trellis will eventually rust.

A conventional wall-mount or in-ground purchased trellis is generally a large rigid structure which is cumbersome to transport and very expensive to ship. Also, these trellises create an end-of-season cleanup problem because dead foliage and vines are an eyesore and can be difficult to remove from a trellis so it can be used the following year.

There are numerous types of plant support brackets that look similar at first glance, but they generally attach to the vertical wall of the fence, which requires hardware installation and limits the weight that can be supported. There may be fence-top brackets on the market, but they are for a single side only, thus the weight they can support will be limited before it pulls on the top of the fence.

Accordingly, there exists a need for a support apparatus and system that is designed for specific locations, particularly on both sides of a long tall wall or fence, or other commonly used locations. And a need also exists for an apparatus that is non-ground supported that can be installed generally above a plant that increases space for root structure and also provides multiple generally vertical paths for the climbing plant shoots. In addition, an improved trellis should create a more aesthetic presentation over a substantial width and increase sunlight exposure to the foliage, which also promotes healthy growth.

PRIOR ART

Others have attempted to support vertically growing vines with an adjustable and collapsible trellis, such as that disclosed by Bayliss in U.S. Pat. No. 3,264,783. Bayliss teaches using rigid rings, rods, and tubing to create a trellis, which entails a considerable amount of assembly work. It relies on support from the ground, preferably with legs pushed into the grounds. Another considerable drawback of Bayliss is the work involved at the end of the season to separate dead vines from the trellis. Swanson in U.S. Pat. No. 7,152,368 discloses a garden trellis with a plurality of vertical rods connected to at least one horizontal rod. The shortcomings are numerous, such as lack of height adjustment, need to physically remove dead vines from the trellis, and support from the ground with attendant leaning and falling over problems. Soot in U.S. Pat. No. 3,935,671 teaches a modular plant panel system with a frame supporting a grid of relatively flexible horizontal and vertical wires, rods, strings, or cables. Once again, there are a few problems, such as lack of height adjustment, need to physically remove dead vines from the trellis, and complicated assembly. Soot teaches a rigid single-height net frame without capability to attach to existing structures. Carlson in US Patent Application 2010/0325949 discloses a plant support apparatus with a single horizontal support member directly engageable with a structure. Included are multiple vertical elongated members that engage with the horizontal support member. By its very nature, the Carlson apparatus and the plane of the climbing plants must be generally perpendicular to the structure supporting it. Also, it is limited in height. One commercially available product with some similarity to the present invention is the adjustable window planter box bracket, such as that by Vigoro. It is designed primarily for a narrow range of railings and configured only for one side.

SUMMARY OF THE INVENTION

In a first aspect, the present invention provides a pair of adjustable brackets and a plant-support system based on the brackets and configured for creating trellises on both sides of a fence or wall for supporting vines and climbing plants over substantially adjustable height and width ranges. The system includes an apparatus having at least one elongated horizontal member and at least two of the adjustable brackets with U-shaped or partial ring at opposing ends of each bracket for supporting the horizontal members. Installed together on a fence or wall, the system is at least sufficient to support at least two elongated flaccid cords having an adjustable length engageable with and suspended from such support member for allowing such vines and climbing plants to intertwine therewith and grow generally vertically. The present invention optionally includes a means for attaching ends of the flaccid cords opposite the horizontal member to an object proximal the plant roots.

OBJECTS OF THE INVENTION

It is, therefore, one of the primary objects of the present invention to provide a system and apparatus for supporting vines and climbing plants over substantial height and width ranges.

Another object of the present invention is to provide an easily installed adjustable apparatus for supporting vines and climbing plants such that the plants can be supported from vertical structures, typically a fence or wall.

Yet another object of the present invention is to provide an apparatus for supporting vines and climbing plants that is attractive but relatively inconspicuous.

Still another object of the present invention is to provide an attractive apparatus for supporting vines and climbing plants that is durable, attractive, yet relatively inexpensive.

Another object of the present invention is to provide an apparatus for supporting vines and climbing plants that includes a multi-year supply of inexpensive strings or cord members that are disposable and can be discarded with dead vegetation at the end of the season.

Yet another object of the present invention is to provide a system, method, and apparatus for supporting vines and climbing plants to over 8 feet in height, and over 8 feet wide, yet will be packaged into a relatively compact box.

Still another object of the present invention is to provide an apparatus and a system for supporting vines and climbing plants adjacent both sides of a fence or wall with a simple attachment to the structure such that it is easy to install, adjust, and remove from the top of the wall or fence without any holes in or damage to the wall.

Another object of the present invention is to provide a compact kit form of a system and apparatus for supporting vines and climbing plants that is adjustable in height and expandable in width.

In addition to the various objects and advantages of the invention which have been described in some specific detail above it should be noted that various other objects and advantages of the present invention will become more readily apparent to those persons who are skilled in the relevant art from the following more detailed description, particularly when such description is taken in conjunction with the appended claims.

DESCRIPTION OF THE PRESENTLY PREFERRED AND VARIOUS ALTERNATIVE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Figure 1:
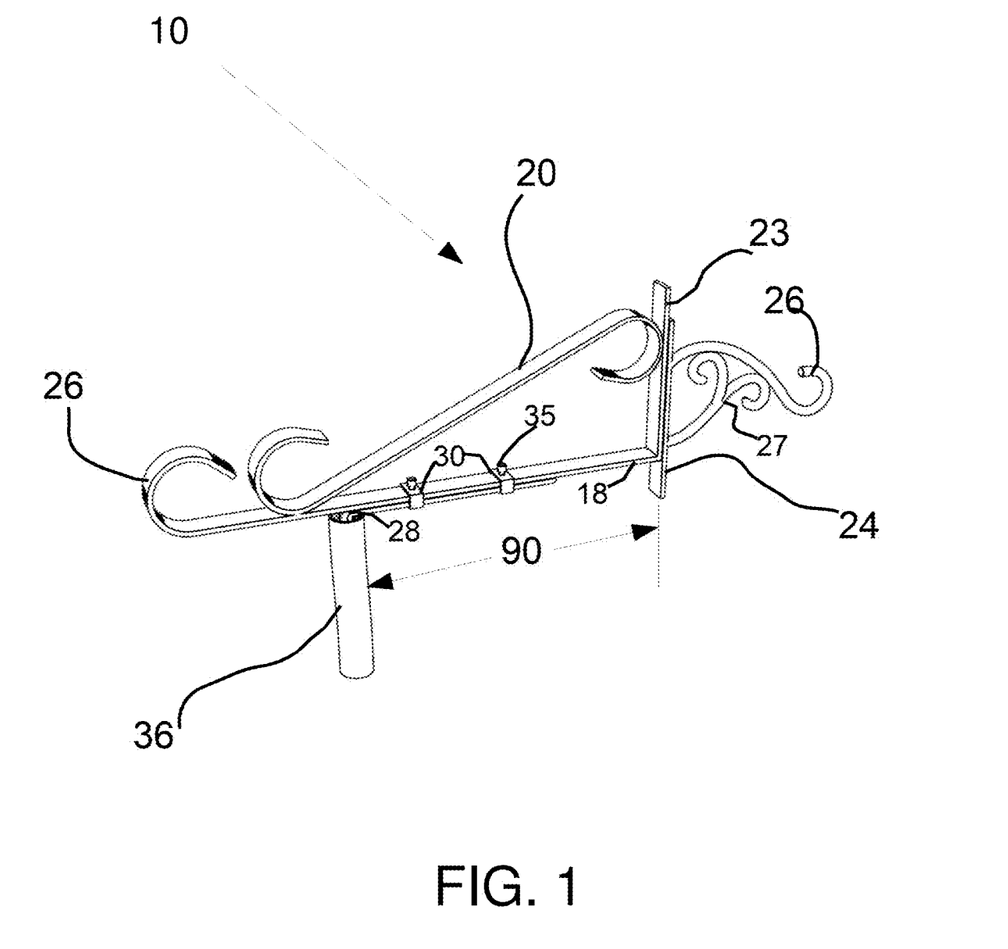
FIG. 1 provides a side elevation view of a preferred embodiment of the adjustable fence-top support bracket for a wide-top wall.

Referring first to FIG. 1, this is a side elevation view of a preferred embodiment of the fence-top support bracket assembly 10 adjusted at the maximum opening for a wide-top wall. The gap 90 between the movable leg 28 and the fixed leg 24 can be adjusted between about 1 and 40 centimeters (cm) by loosening the clamp bolts 35 on the one or more U-shaped clips 30 and moving the movable L-shaped leg 28 along the underside of the elongated bar 18, and then tightening the U-shaped clips 30 with the aid of the bolts 35. The fixed leg 24 is a protruding end section of the flange portion 23 of the scroll member 27. U-shaped cradles or partial loops 26 are at opposing ends of each fence-top support bracket such that a horizontal support bar can be supported on two or more spaced-apart dual-support brackets on a wall or fence. One or both of the extended portions of the fixed leg 24 or movable L-shaped leg 28 are optionally partially encased with a mar guard 36 to protect against damage or marking the fence or wall, and also to aid with a tight fit against a wall.

Figure 2:
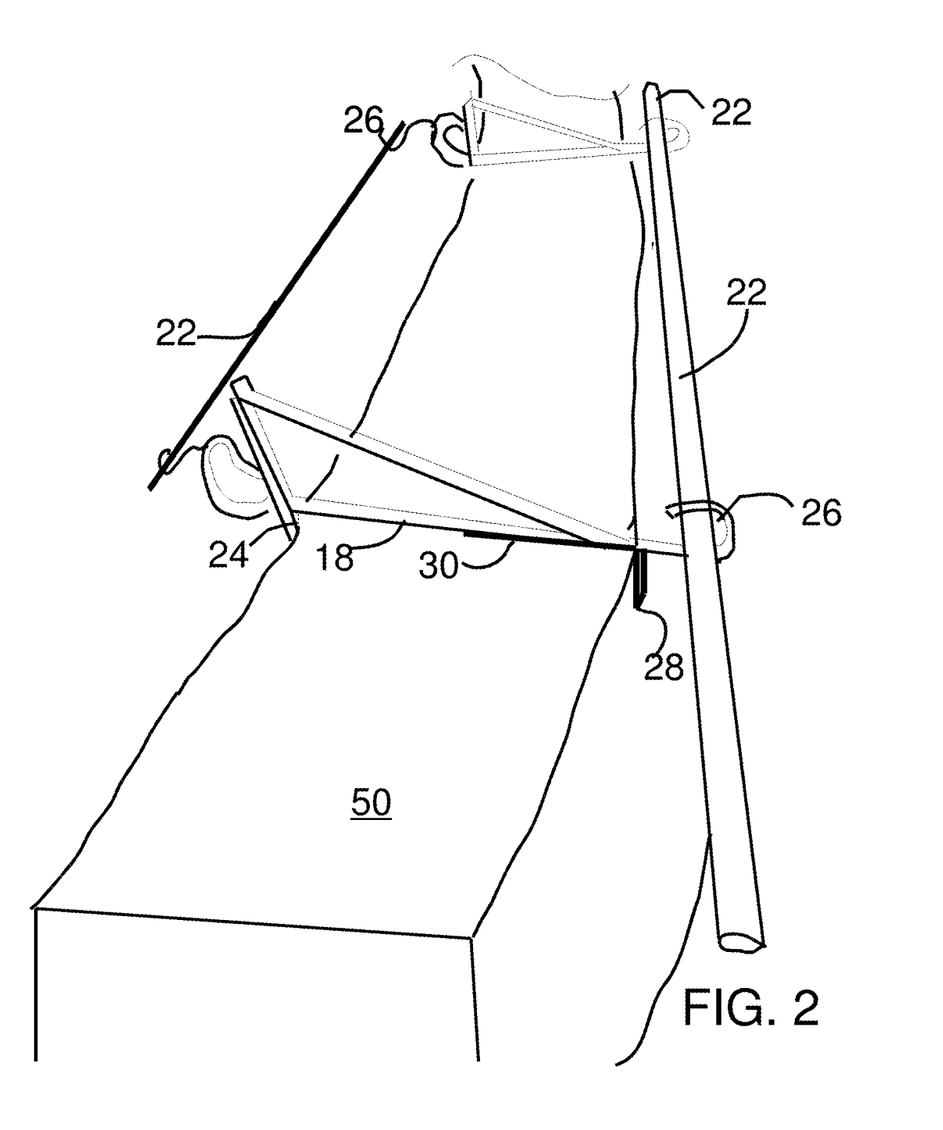
FIG. 2 provides a perspective view of the preferred fence-top trellis system for supporting horizontal members from both sides of a wall.

FIG. 2 provides a perspective view of the preferred method of utilizing the dual-side adjustable bracket 10 for supporting horizontal rod members from a wall 51, such as a stone retaining wall. With the clamp bolt 33 loose, the movable leg 28 is slid under the elongated bar 18 to get the appropriate gap between legs 28 and 24 so as to fit snugly over the top of the wall 51. The horizontal support members 22 are supported near their ends by the adjustable bracket 10, by being cradled in the end loop portions 26. If desired, a screw in the end cradle can be tightened to better hold the horizontal support members 22 in place. Shown for member 22 is a PVC pipe.

Figures 3, 4:
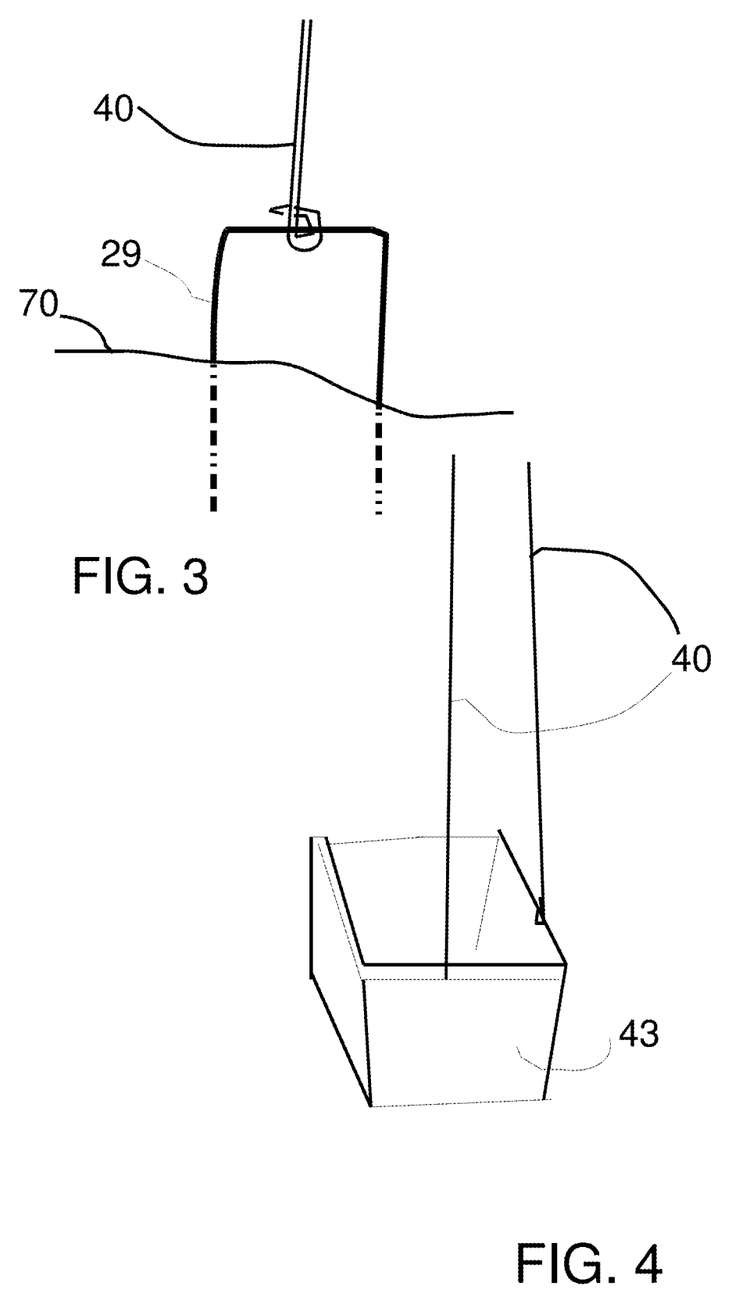
FIG. 3 is a perspective view of a ground stake arrangement for adjustably securing the elongated flaccid cords of the present system at ground level opposite the support member.
FIG. 4 provides a perspective view of an alternative attachment method for anchoring the cords of the present trellis system adjacent the plants at the end opposite the support member.

FIG. 3 is a perspective view of a ground anchor arrangement for adjustably securing the elongated flaccid cords 40 at ground level opposite the support member. This is illustrated to provide a best mode of operation of the invention, and is not itself an element of the apparatus invention, but would be for system and method claims. The anchors 26 adjacent the plants may be either plastic pegs with a head or elongated metal staples 29 as shown here and in FIG. 10. The cords 40 are secured to the anchor in any desired fashion.

FIG. 4 provides a perspective view of an alternative means for anchoring the cords 40 near the plants when they are potted. The lower cord ends can be tied to the container 43, to the plant itself, or to an item embedded in the soil of the container 43.

Figure 5:
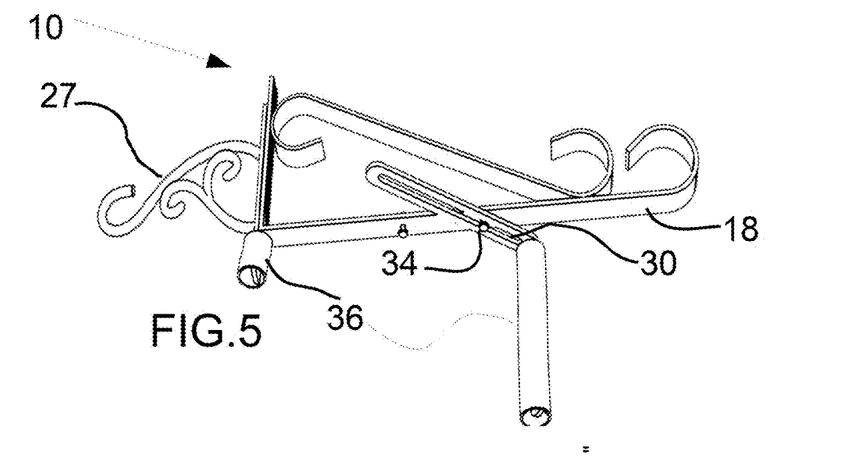
FIG. 5 provides a side perspective view of an alternative embodiment of the fence-top support bracket.

FIG. 5 provides a side perspective view of an alternative embodiment of the support bracket 10 with a slotted L member 28 partially rotated between a narrow opening and a wide opening. The partially rotated position is just for better illustration. The elongated slot 30 will generally be adjacent and parallel to the elongated arm 18 of the elongated portion 18 of the dual support bracket 10 and held in position by two bolts.

Figures 6, 7:
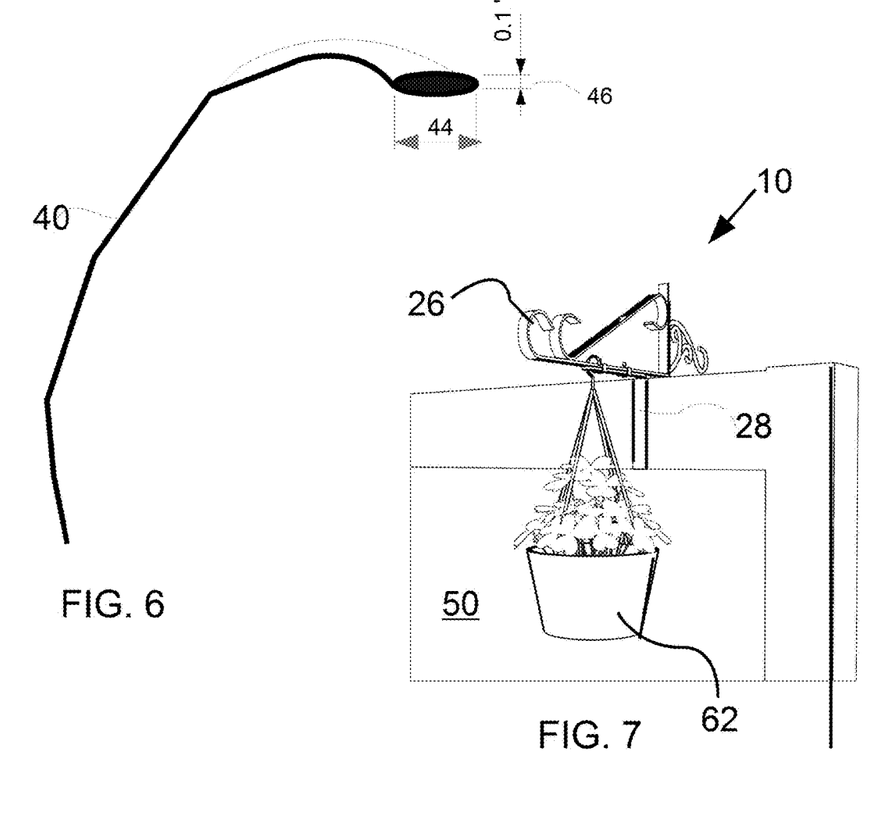
FIG. 6 is a perspective view of the flaccid cord used in the present invention and a cross section thereof.
FIG. 7 provides a perspective view of a non-trellis use of one side of a single support bracket.

FIG. 6 is a perspective view of an end of the flaccid cord used in the present invention. By "flaccid" is meant, within the scope of the invention, not wire-like and not semi-rigid, yet durable but limp when held between two fingers. It is preferred that the flaccid cord 40 have a generally oval cross section with an aspect ratio, 44 divided by 46, of at least two, but preferably three or greater. This ratio is not essential, but is desirable to aid in providing a compact spool and to make the cords less visible such that from a distance the plants appear to be growing up an invisible trellis. The flaccid cords 40 are typically made of very flexible polyvinyl chloride (PVC) pigmented to a color, preferably black, and made resistant to sunlight degradation. Unexpectedly, many climbing flowers and plants have been found to attach very readily to these cords in spite of the very smooth outer surface. Examples include clematis, Mandevilla, and pole beans.

FIG. 7 provides a perspective view of an optional non-trellis use of one of the elongated bracket portion of the dual-support bracket 10. After adjustment of the movable leg 28 for a snug fit on the fence 50, a typical hanging plant 62 can be supported near the curved loop 26. The hanging of plants on both side of a fence also serves to counterbalance that on each side, a key feature of the present invention.

Figure 8:
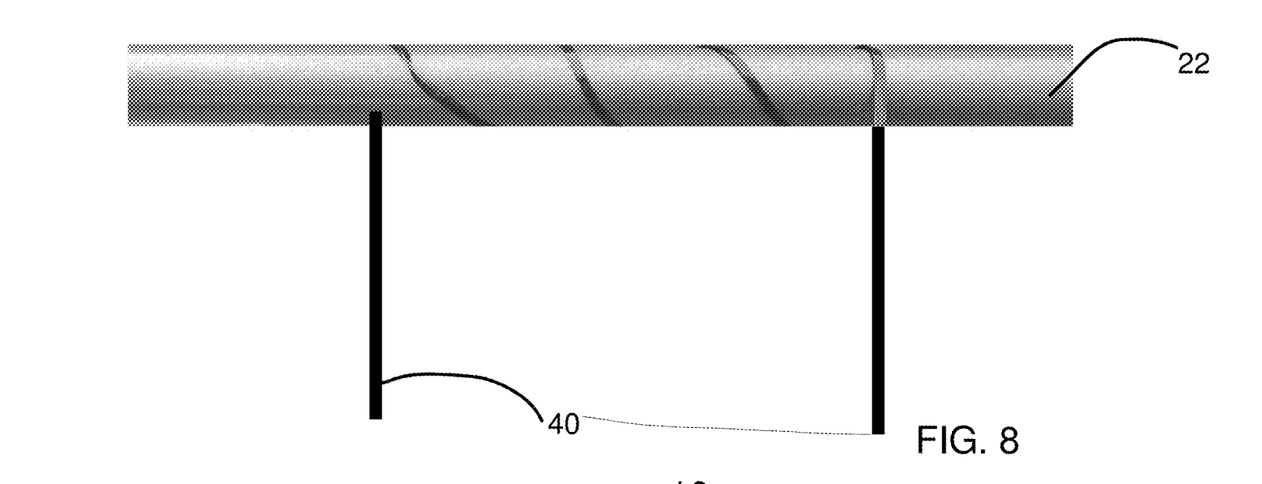
FIG. 8 provides an elevation view of the preferred method of attaching the cords to the horizontal support rods.

FIG. 8 provides an elevation view of the preferred method of attaching the cords 40 to the horizontal support bar 22. With one end of the elongated flaccid cord 40 extending down to near the plant root, the approximate mid-section of the cord 40 is wrapped spirally two or more times around the horizontal support bar 22. This step is facilitated by the nature of the flaccid and oval cross section nature of the cords as shown in FIG. 6 and its description.

Figure 9:
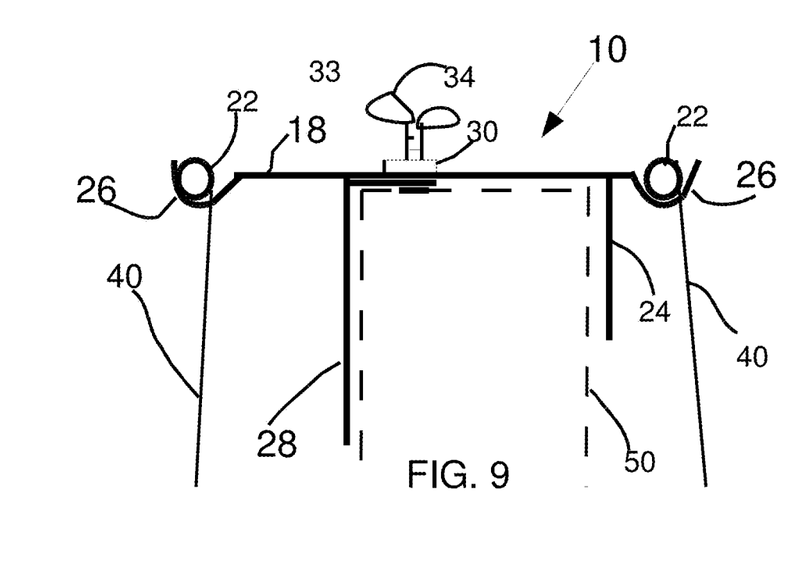
FIG. 9 provides an end elevation view of an alternative embodiment for a fence-top support bracket adjusted for a wide-top wall.

FIG. 9 provides a simplified end elevation view of another method of utilizing the adjustable dual-support bracket assembly 10 for supporting horizontal trellis-support members 22 on both sides of a wall 50. Each bracket 10 has an elongated bar portion 18 with a fixed branch leg 24. At opposing ends of each is at least one U-shaped cradle or curved loop 26 configured to slidingly support one end portion of the horizontal support member 22. At least two dual-support brackets are needed to support a horizontal member; hence, a kit being sold for this purpose must have at least two fence-top support brackets 10.

Figure 10:
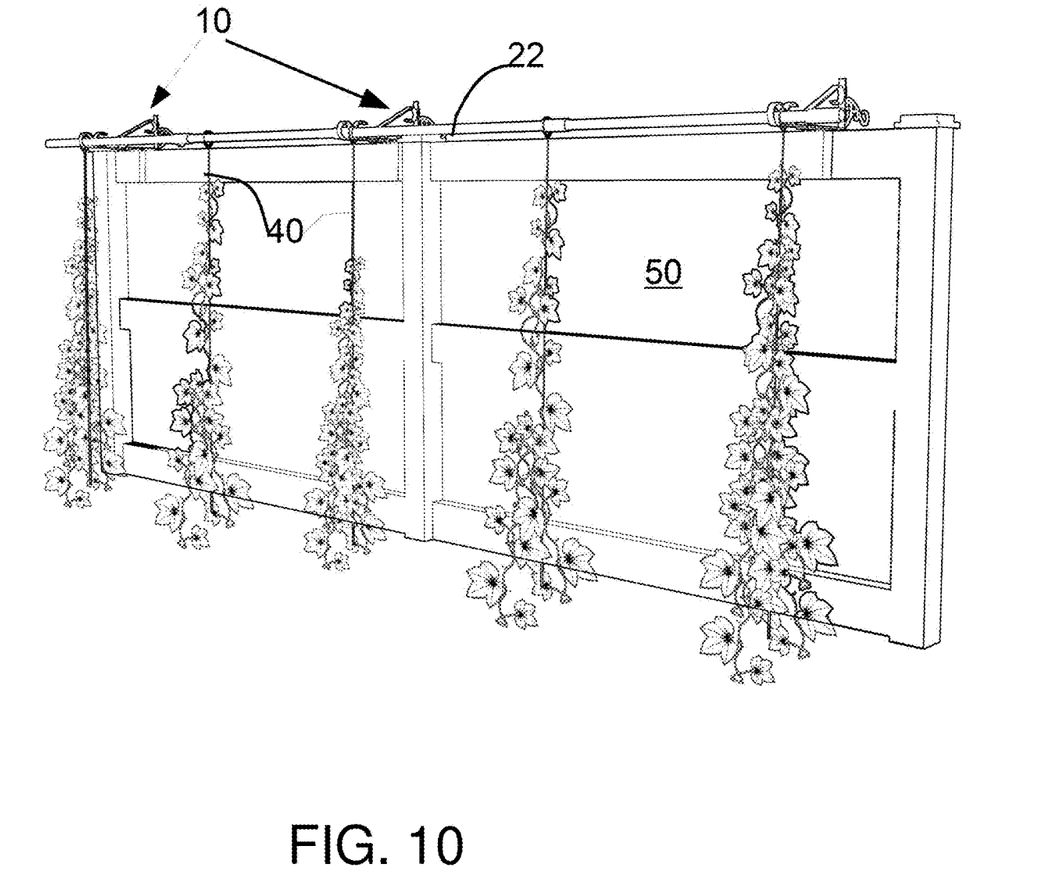
FIG. 10 provides an elevation view of how the system of the present apparatus may be deployed in front of a tall fence for supporting flowering vines.

FIG. 10 provides an elevation view of how the system of the present apparatus 10 and flowering vines 60 may be deployed in front of a tall fence 50. These plain white fences have become very common around businesses and back yards, and are sorely in need of being dressed up. Depicted is how clematis plants 60 may appear in front of one of these fences. It has been unexpectedly demonstrated that these plants and Mandevilla vines readily climb up the flaccid cords of this invention more than 7 feet in a season. Surprisingly, this is accomplished without cross members or intersecting horizontal cords as found in nets generally suggested by others. However, nets or rigid rods would still be acceptable options, just not preferred. Two or more support brackets 10 engage with the top of the fence 50 and a horizontal support bar about 3 meters (10-feet) long is supported from the bracket assemblies 10. Multiple flaccid cords 40 attach to the support crossbar 22 and are anchored to the ground adjacent the plants 60 as shown in FIGS. 5 and 6. The preferred cord color is black as the cords are nearly inconspicuous and withstand UV radiation for at least one summer. A big advantage of this system is the end-of-season cleanup. The cords and plants are cut down together near both ends. The low cord cost makes it practical to do so and just put up new ones the next season.

Figure 11:
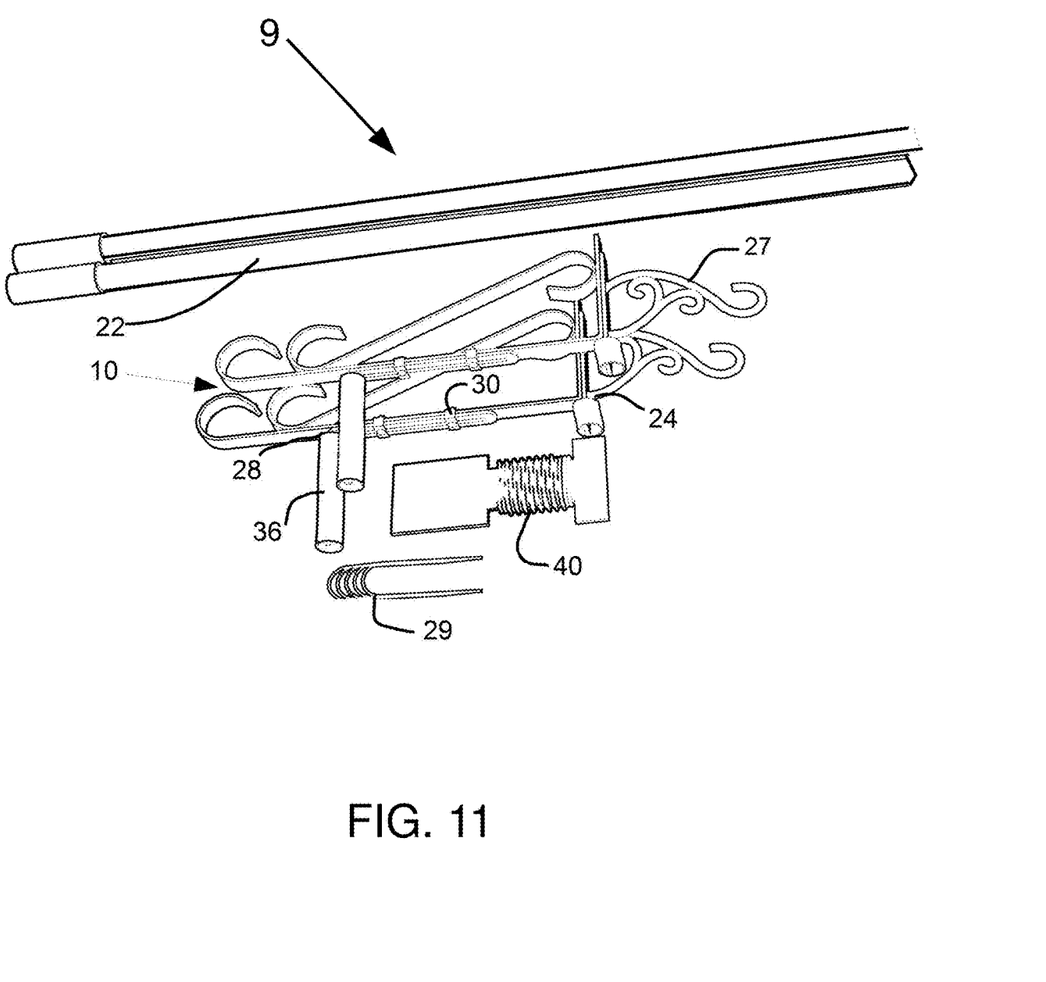
FIG. 11 presents a plan view of a kit based on a pair of adjustable fence-top brackets of the current invention and configured for installing the trellis system of the current invention.

FIG. 11 presents a plan view of a kit 9 based on the adjustable bracket assembly 10 of the current invention and configured for installing the trellis system of the current invention. It has two adjustable brackets 10 and at least 2 segments of horizontal support members 22. Two segments can be to be connected with couplings 24 such that there is one longer horizontal support rod, or one can be for each side of the wall or fence. A substantial supply of flaccid cord 40, generally between 30 meters (90 ft) and 100 meters, is included. A few ground anchors (staples) 29 are an optional inclusion.

While a presently preferred embodiment and alternate embodiments of the present invention have been described in detail above, it should be understood that various other adaptations and/or modifications of the invention can be made by those persons who are particularly skilled in the art without departing from the spirit of the invention.

We claim:

1. An adjustable fence-top trellis bracket assembly kit comprising:
    a) an L-shaped bracket member with an elongated bar portion of a first length and an elongated 90-degree branch portion of a second length perpendicular to the elongated bar portion;
    b) an adjoining bracket member configured with a tab portion for engagement with a wall;
    c) curved-loop ends on the elongated bar portion and the adjoining bracket member wherein one is attached proximal one end and the other proximal an opposite end of the elongated bar portion;
    d) a movable L-shaped leg member having a portion parallel to said elongated bar portion and a portion perpendicular to said elongated bar portion;
    e) hardware for removably fastening the movable L-shaped leg to the elongated bar portion; and
    f) a supply of flaccid cord having a predetermined length and configured to provide a plurality of generally vertical disposable trellis elements.

2. The adjustable fence-top trellis bracket assembly kit of claim 1 further comprising a removable sheath configured for a slip resistant covering for the tab portion and the portion perpendicular to said elongated bar portion.

3. The adjustable fence-top trellis bracket assembly kit of claim 1 wherein said predetermined length of the supply of flaccid cord is between 30 and 100 meters.

4. The adjustable fence-top trellis bracket assembly kit of claim 1 wherein said hardware includes at least two clamps with bolts for tightening.

5. The adjustable fence-top trellis bracket assembly kit of claim 1 wherein the flaccid cord is a flexible PVC cord with a cross section aspect ratio of 2 or more.

* * * * *